Patented July 31, 1934

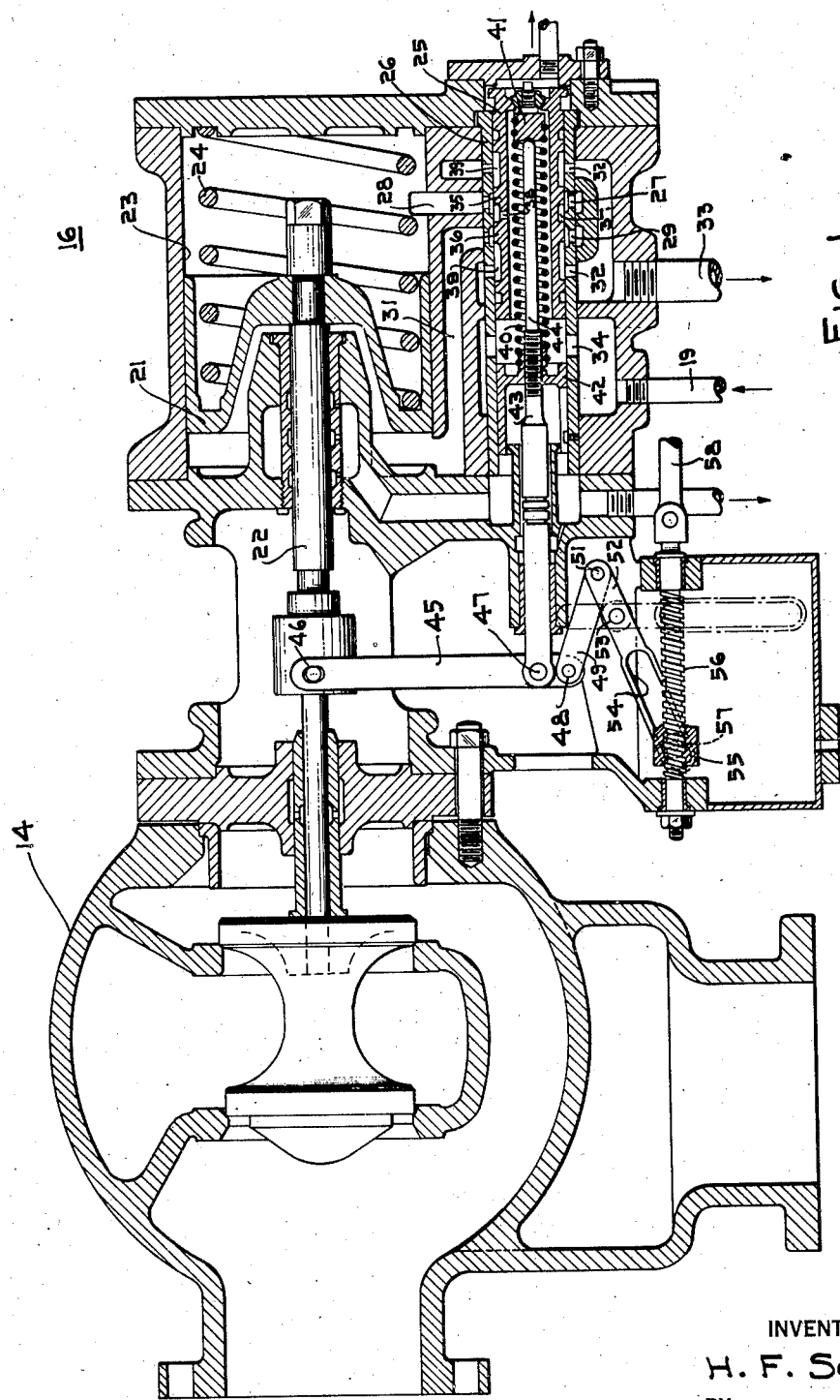

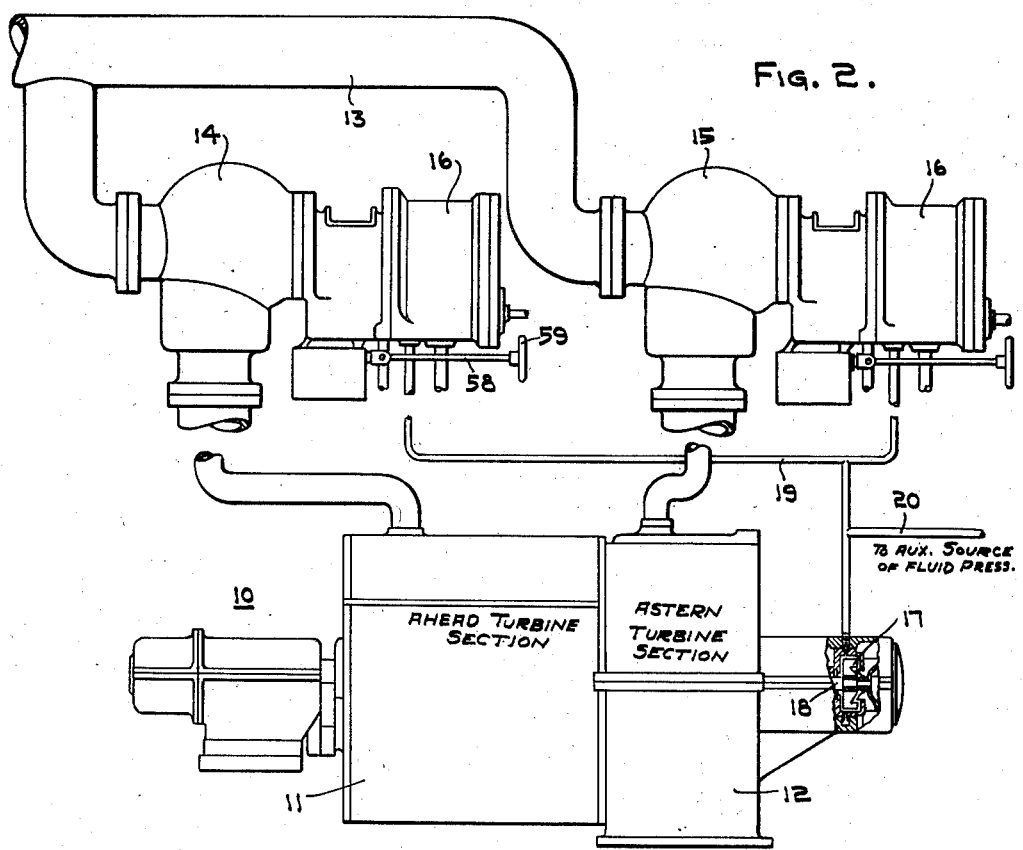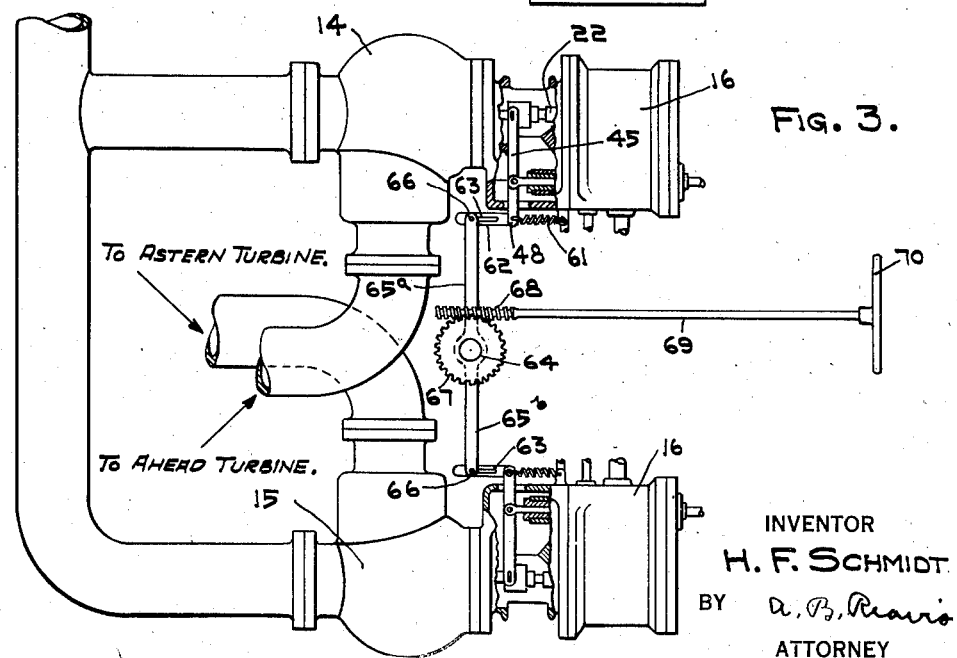

1,968,656

UNITED STATES PATENT OFFICE 1,968,656

VALVE CONTROL MECHANISM

Henry F. Schmidt, Lansdowne, Pa., assignor to Westinghouse Electric & Manufacturing Company, a corporation of Pennsylvania Application June 19, 1931, Serial No. 545,603

14 Claims. (Cl. 137—158)

My invention relates to a control mechanism, more particularly to a control mechanism for a variable speed prime mover, and it has for its object to provide a mechanism of the character set forth which effects improved regulation.

Several forms of governor are known which provide satisfactory speed regulation at a given speed, and even over a substantial range of speed. It has been found difficult, however, to provide satisfactory regulation for the full range of speed of a prime mover, such as a marine turbine. Consequently, variable speed prime movers, particularly marine turbines, have ordinarily been provided with manually-controlled valve operating mechanism.

It is a more particular object of my invention to provide a control mechanism which effects speed regulation for speeds at which satisfactory regulation may be obtained, and which provides manual control only at other speeds.

Difficulty has also been experienced in providing satisfactory speed-limiting mechanisms for marine turbines. Such mechanisms as have heretofore been provided have generally been subject to one of two objections; either, they have been apt to effect closing of the admission valve in normal operation, or if designed to assure non-interference in normal operation, they have been subject to sticking on account of long periods of non-use and their operativeness in case of overspeed could not be depended upon.

It is a further object of my invention to provide a speed-limiting mechanism, the operativeness of which is assured at all times that the admission valve is operated, and which can not trip the admission valve closed in the normal operation of the turbine.

In accordance with my invention, I provide a control mechanism including a governing mechanism responsive to the speed of the prime mover, and a control member, which may be manually actuated, connected to the governing mechanism and adapted to adjust the speed setting thereof. Provision is made for limiting the speed-responsive action of the governing mechanism to a predetermined minimum speed, so that at lower speeds the control member determines the position of the admission valve independently of the speed, the control member having a sufficient extent of movement to effect closing movement of the admission valve at lower speeds.

The governing mechanism includes an element which is movable by the control member and by change in speed of the prime mover, and which must be moved to operate the admission valve. Since this element must be operative in the normal operation to effect opening of the admission valve, its operativeness in case of overspeed is assured.

These and other objects are effected by my invention as will be apparent from the following description and claims taken in connection with the accompanying drawings, forming a part of this application, in which:

Fig. 1 is a sectional view of the control mechanism and the admission valve actuated thereby;

Fig. 2 is a diagrammatic view showing a marine turbine having ahead and astern admission valves, each provided with my novel control mechanism; and, Fig. 3 shows control mechanisms, for ahead and astern valves, having a common control member.

Referring now to the drawings more in detail, in Fig. 2, I show a marine turbine 10 having an ahead section 11 and an astern section 12. Motive fluid for the turbine is supplied from any suitable source through a conduit 13, the admission to the ahead section 11 being controlled by an ahead admission valve 14, and the admission to the astern section 12 being controlled by an astern admission valve 15. Each of the admission valves is actuated by a control mechanism 16. An impeller 17 is mounted on the turbine shaft 18 and develops a fluid pressure varying as a function of the speed of the turbine, which is conveyed through a conduit 19 to each of the control mechanisms 16. A conduit 20 communicates with an auxiliary source of fluid pressure for use in starting the turbine.

Referring now to Fig. 1, the control mechanism 16 includes a piston 21 connected to the valve 14 through a rod 22. The piston operates in a cylinder 23, and is biased in valve-closing direction by a spring 24.

The application of fluid pressure to the piston is controlled by a pilot valve 25 operable in a bushing 26. The bushing is provided with an annular row of ports 27 communicating with the right-hand end of the cylinder 23 through a passage 28, and with an annular row of ports 29 communicating with the left-hand end of the cylinder through a passage 31. It is further provided with two rows of ports 32, disposed on opposite sides of the ports 27 and 29 and communicating with a discharge conduit 33. The bushing is further formed with ports 34 providing communication between the fluid pressure supply conduit 19 and the interior of the pilot valve 25, the latter being in the form of a sleeve closed at the right-hand end.

The pilot valve 25 is provided with piston portions 35 and 36, adapted to cover the ports 27 and 29, respectively, in the cut-off position of the pilot valve. Between the piston portions 35 and 36 is an annular recess 37, and the pilot valve is formed with ports 38 providing communication between the recess 37 and the interior of the pilot valve. On opposite sides of the piston portions 35 and 36, the pilot valve is formed with recesses 39, providing communication with the discharge ports 32.

A tension spring 40, extending into the interior of the pilot valve 25, is connected at one end to a spring-holding member 41 carried by the closed end of the pilot valve 25, and at its other end to a spring-holding member 42, screw-threaded on a rod 43. The rod 43 extends to the right and forms a stop against which the spring holding member 41 is adapted to abut, thereby providing a minimum deflection of the spring 40. It is to be specially noted that while I have disclosed an extension of the rod 43 as bearing against a spring holder 41 for obtaining an initial tension on the governing spring 40; my invention, in its broader aspects, is not so limited, for other means may be used for performing this function without departing from the spirit thereof. The member 42 is constructed in the form of a piston fitting the bushing 26, and forms a wall for the fluid pressure supplied to the interior of the pilot valve 25.

A lever 45 is pivoted at 46 to the piston rod 22 and at 47 to the rod 43. It is also pivoted at 48 to a link 49, the other end of which is pivoted at 51 to a lever 52. The lever 52 is fulcrumed at 53 and is formed with a slot 54. A cross-head 55 is screw-threaded on a rod 56 and carries rollers 57 engaging in the slot 54. The rod 56 is connected to a rod 58, on which there is mounted a hand wheel 59 (Fig. 2) for rotating the same.

The operation of the above-described mechanism is as follows:

The turbine 10 may have a maximum normal operating speed of 3600 R. P. M. and the control mechanism may be designed to provide speed-responsive governing at speeds above 3000 R. P. M. and exclusive control by the control member at speeds below 3000 R. P. M. In the present description, the cross-head 55 will be considered as the control member, since it determines the position of the lower end of the lever 45. Movement of the control member 55 to the right effects increased opening of the admission valve, and movement to the left effects decreased opening.

The spring 40 is adjusted, by adjusting the spring holding member 42 on the rod 43, to an initial deflection which will just balance the force of the fluid pressure, developed by the impeller 17 and acting on the pilot valve 25, when the turbine is operating at the predetermined speed above which it is desired to effect governing, in this case assumed to be 3000 R. P. M.

In the position of the parts shown on the drawings, the control member 55 is in the position providing complete closing of the admission valve 14. The pilot valve is disposed slightly to the right of the cut-off position. Fluid pressure is admitted to the ports 38 and 37 to the right-hand end of the cylinder 23 in which it acts on the piston 22 to hold the valve 14 tightly on its seat.

Assume, now, that the control member 55 is moved part-way to the right, to move the pivot 48 to the left. As the piston portions 36 and 35 of the pilot valve 25 move to the left of the ports 29 and 27, respectively, fluid pressure is admitted through the ports 38, the recess 37 and the ports 29 to the left hand end of the cylinder 23. Fluid in the right hand end of the cylinder is discharged through the ports 27, the recess 39 and the ports 32 to the discharge conduit 33. The piston 21 moves the admission valve in opening direction until the pilot valve is returned to cut-off position, which is effected by movement of the rod 22 to the right, transmitted to the pilot valve through the lever 45 and the rod 43.

Assuming that it is desired again to decrease the valve opening, the control member 55 is moved to the left to move the pivot 48 and the pilot valve 25 to the right beyond cut-off position. Fluid pressure is admitted through the ports 38, the recess 37 and the ports 27 to the right hand end of the cylinder 23, and the fluid in the left-hand end thereof is exhausted through the ports 29, the recess 39 and the ports 32 to the discharge conduit 33. The piston 21 moves the admission valve in closing direction until the pilot valve is returned to cut-off position, which is effected by the piston rod 22 through the lever 45 and the rod 43.

In both of the above operations, it has been assumed that the speed of the turbine did not attain 3000 R. P. M., so that the pilot valve 25 was, in effect, connected to the pivot 47 by a link of fixed length. Movement of the operating piston and the admission valve is effected, therefore, solely by movement of the controlling member 55, the control mechanism operating merely as a manually controlled fluid pressure relay.

Assume now, that movement of the control member 55 to the right is continued until the speed of the turbine exceeds 3000 R. P. M., at which time the pressure developed by the impeller 17 deflects the spring 40 beyond its initial deflection and moves the pilot valve 25 to the right, beyond the position which it would otherwise be moved by the control member 55, were the spring to remain in its initial deflection. The pilot valve is now speed-responsive, and the control member 55, instead of determining the exact position of the admission valve, determines the speed setting or governing range. For a given position of the pivot 48, providing a given speed setting, the governing action is as follows:

Upon increase in speed, the fluid pressure developed by the impeller 17 increases and moves the pilot valve 25 to the right, elongating the spring 40. The right hand movement of the pilot valve causes the operating piston 21 to move to the left in valve-closing direction. The pilot valve 25 is returned to the left to cut-off position by the rod 22 through the lever 45, the rod 43 and the elongated spring 40. Upon a decrease in speed and fluid pressure, the spring 40 moves the pilot valve 25 to the left. The operating piston 21 moves to the right in valve-opening direction until the pilot valve is again moved to the right to cut-off position.

If the control member 55 is now moved to the right, it will effect a higher speed setting in the following manner:

The pilot valve 25 is moved to the left by the left-hand movement of the lower end of the lever 45, and applies fluid pressure to the valve operating piston 21 in valve opening direction to increase the speed of the turbine. The parts of the control mechanism, which is now functioning as a governing mechanism, will come to rest at a higher speed. As the lower end of the lever 45 is positioned further to the left, a higher fluid pressure is required to bring the pilot valve 25 to cut-off position for a given position of the admission valve. A higher speed setting of the governing mechanism is effected.

To provide a decreased speed setting, the control member 55 is moved to the left, moving the lower end of the lever 45 and the pilot valve 25 to the right. The latter effects movement of the operating piston 21 to the left in valve closing direction to decrease the speed of the turbine. The parts of the governing mechanism come to rest at a lower speed; the lower end of the lever 45 being further to the right, a lower fluid pressure is required to bring the pilot valve 25 to cut-off position. The governing mechanism is now adjusted to a lower speed setting.

It will be understood that any desired speed may be chosen as the predetermined speed above which speed governing is effected, by adjusting the initial deflection of the spring 40 to the fluid pressure developed at the desired speed. This speed is preferably not less than four-tenths of the maximum operating speed, since it becomes difficult to provide satisfactory and practical governing at lower speeds. The predetermined speed may also be the maximum operating speed, in which case the speed-responsive means serves only as an overspeed or speed-limiting mechanism.

From the above description, it will be seen that I have provided a control mechanism wherein movement of a single control member controls the prime mover at all speeds, the control at lower speeds being by direct control of the valve position and the control at the higher speeds being of the governor speed setting.

An important advantage of the present mechanism resides in the fact that it is at all times operative as an overspeed governor. The pilot valve 25 must be moved in the normal operation of the admission valve to effect opening and closing thereof. It is assured, therefore, that upon overspeed of the turbine, the pilot valve will not stick, but will move to effect closing movement of the admission valve.

Regardless of the position of the control member 55, the admission valve is moved in closing direction as soon as the turbine exceeds the predetermined minimum speed, assumed in this case to be 3000 R. P. M. As the control member is moved in speed-decreasing direction, the travel of the admission valve required to bring it to full closed position is decreased. Therefore, the overspeed effecting full closing of the admission valve decreases as the control member is moved to lower speed positions.

The control member 55 may be considered as determining the position of the admission valve, and the speed-responsive means as modifying the action of the control member, when the predetermined speed is exceeded. For example, assume that the turbine is operating at low speed and that it is desired to bring the speed up to a speed above 3000 R. P. M. The control member 55 is moved a sufficient distance to the right. Until the turbine comes up to 3000 R. P. M., the control mechanism operates merely as a relay to move the admission valve to a position determined by the position of the control member 55. As the predetermined speed is exceeded, the fluid pressure elongates the spring 40, and the admission valve is moved in closing direction. The mechanism is then operative to govern the speed at the setting determined by the position of the control member 55.

In Fig. 3, I show an embodiment of my invention in which two control mechanisms are similarly provided to actuate the ahead and astern admission valves of a prime mover, but in which a common control member is arranged to effect opening of either one of the valves. The control mechanisms proper are the same as in Fig. 1, but there are connected to the lever 45 of each control mechanism at the pivot 48, instead of the parts shown in Fig. 1, a spring 61 biasing the lever 45 in valve-closing direction, and a link 62 having a slot 63. A shaft 64 constitutes the control member, and has lever arms 65a and 65b mounted thereon, the outer ends of which have pins 66 engaging in the slots 63 of the respective mechanisms. A gear 67 on the shaft 64 is engaged by a worm 68, the latter being formed on a shaft 69 which has a hand-wheel 70 for rotating the same.

In the position shown on the drawings, both valves are closed. Upon rotating the control shaft 64 in counter-clockwise direction, by means of the hand-wheel 70, the pin of the lever arm 65a engages end of its slot 63 and effects opening of the ahead admission valve 14, while the pin of the lever arm 65b slides in its slot. Upon rotating the shaft in counterclockwise direction, the ahead admission valve 14 is first closed, and thereafter the pin of the lever arm 65b engages the end of its slot 63 to effect opening of the astern valve 15, while the pin of the lever arm 65a slides in the slot.

While I have shown my invention in two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. A control mechanism for the admission valve of a variable speed prime mover comprising governing mechanism responsive to the speed of the prime mover above a predetermined speed, a single control means having a range of adjustment, and means for moving the admission valve to a position determined by the adjustment of said control means when the speed of the prime mover is below said predetermined speed and for changing the setting of said governing mechanism in accordance with the adjustment of said control means when the speed of the prime mover is above said predetermined speed.

2. The combination with a variable speed prime mover having an admission valve, of a control mechanism for said admission valve comprising speed-responsive means, speed-changer means, means responsive to the speed-changer means and to the speed-responsive means for controlling the admission valve, and means for limiting the responsiveness of the speed-responsive means to speeds above a given minimum speed, the speed-changer means having an extent of movement rendering the same operative to control the admission valve at speeds below said given minimum speed.

3. The combination with a variable speed prime mover having an admission valve, of a control mechanism for said admission valve comprising means responsive to the speed of the prime mover for controlling the admission valve, means for limiting the action of the speed-responsive means in response to decrease in speed of the prime mover to a given minimum speed thereof, and a control member movable to vary the speed setting of the speed-responsive means, the control member and speed-responsive means being so arranged that movement of the control member in speed-decreasing direction when the speed of the prime mover is below said given speed is effective to provide closing movement of the admission valve.

4. The combination with a variable speed prime mover having an admission valve, of a control mechanism for said admission valve comprising a control member, means for moving the valve to a position determined by the position of the control member, and means responsive to speed of the prime mover above a given minimum speed for modifying the action of said means to effect speed governing.

5. The combination with a variable speed prime mover having an admission valve, of a control mechanism for said admission valve comprising a control member for determining the opening of the admission valve, means including and controlled by the control member for moving the admission valve, and means interposed between the control member and the valve and responsive to speed of the prime mover above a predetermined minimum speed for modifying the action of the last-mentioned means to provide speed-responsive governing, said control member being controlled otherwise than by said speed responsive means.

6. The combination with a prime mover having an admission valve, of a control mechanism for the admission valve comprising means responsive to the speed of the prime mover above a given speed for controlling the admission valve, and a control member for changing the speed of the prime mover, the speed-responsive means serving to govern the prime mover at a speed setting determined by the control member when the speed of the prime mover is above said given speed, and serving to move the admission valve to a position determined by the control member when the speed of the prime mover is below said given speed.

7. The combination with a variable speed prime mover having an admission valve, of a control mechanism for said admission valve comprising a fluid pressure relay for actuating the admission valve, means responsive to speed of the prime mover above a predetermined speed for controlling the relay, a control member connected to the relay and to the speed-responsive means for varying the setting of the speed-responsive means when responsive to speed and for alone controlling the relay when the speed-responsive means is not responsive to speed.

8. A control mechanism for the admission valve of a variable speed prime mover comprising a member for changing the speed of the prime mover, means providing a governing force varying as a function of the speed of the prime mover, a second member subjected to said governing force, a spring interposed between said members and deflected by said governing force, stop means providing a minimum deflection of the spring for rendering the control mechanism unresponsive to speed and rendering the control member effective to determine the position of the admission valve when the speed of the prime mover is below a minimum speed, the control member having a sufficient extent of movement to effect closing movement of the admission valve when the spring is at minimum deflection.

9. In an operating mechanism for the admission valve of a prime mover, the combination of control means for determining the position of the valve, a fluid pressure relay controlled by said control means for moving the valve to the position determined by the control means, and means responsive to speed of the prime mover above a predetermined speed for controlling the relay to move the valve in closing direction beyond the position determined by the control means, said control means being controlled otherwise than by said speed responsive means.

10. In an operating mechanism for the admission valve of a prime mover, the combination of a control member for determining the position of the valve, a fluid pressure relay controlled by said control member for moving the valve to the position determined by the control member, and means responsive to increase in speed of the prime mover above a predetermined speed for controlling the relay to move the valve in closing direction beyond the position determined by the control member.

11. In an operating mechanism for the admission valve of a prime mover, the combination of a control member for determining the position of the admission valve, a fluid pressure relay including a pilot valve, a spring-holding member connected to the control member, a spring connecting the spring-holding member and the pilot valve, means for imposing on the pilot valve in opposition to the force of the spring a fluid pressure varying as a function of the speed of the prime mover, the relay being constructed and arranged to move the valve in closing direction upon increase in spring deflection, stop means acting between the spring holding member and the pilot valve for effecting a predetermined minimum deflection of the spring which balances the fluid pressure at a predetermined speed of the prime mover, whereby, while the speed of the prime mover is below said predetermined speed, the position of the admission valve is determined by the control member, and when the speed exceeds said predetermined speed, the admission valve is moved in closing direction beyond the position determined by the control member.

12. A control mechanism for the admission valve of a prime mover comprising a control member, mechanism whereby the control member effects opening and closing movement of the admission valve, said mechanism including an element which must be moved to effect movement of the admission valve and which is movable by the control member, and means providing fluid pressure varying as a function of the speed of the prime mover, said element being subjected to said fluid pressure and operative upon increase above a predetermined value thereof to effect a closing movement of the admission valve.

13. The combination with a prime mover having an admission valve which provides only increase of admission upon movement in one direction and only decrease of admission upon movement in the opposite direction, of mechanism for controlling the admission valve comprising governing means responsive only to speeds above some given speed for controlling the admission valve and including relatively slidable members, one of which must move to effect control of the admission valve by the governing means, control means which is controlled independently of the speed of the prime mover for normally controlling the admission valve at speeds below said given speed, and means operative upon movement of said control means for moving one of said relatively slidable members to maintain free movability therebetween, whereby the possibility of sticking between said slidable members in case of overspeed after a long period of non-operation of the governing means is avoided.

14. The combination with a prime mover having an admission valve which provides only increase of admission upon movement in one direction and only decrease of admission upon movement in the opposite direction, of mechanism for controlling said admission valve comprising a control member, means for moving the admission valve to a position determined by the position of the control member at speeds below a predetermined speed comprising a fluid pressure relay including an operating piston connected to the admission valve and pilot valve means controlling the application of fluid pressure to said piston, said pilot valve means comprising relatively slidable valve members, one of which is controlled by said control member, and means responsive to increase in speed above said predetermined speed for moving one of said valve members to effect closing movement of the admission valve beyond the position determined by the control member.

HENRY F. SCHMIDT.